United States Patent
Emmett et al.

(10) Patent No.: US 12,029,249 B2
(45) Date of Patent: Jul. 9, 2024

(54) RADIATION HEATED AEROSOL-GENERATING SYSTEM, CARTRIDGE, AEROSOL-GENERATING ELEMENT AND METHOD THEREFOR

(71) Applicant: PHILIP MORRIS PRODUCTS S.A., Neuchatel (CH)

(72) Inventors: Robert Emmett, Neuchatel (CH); Ana Isabel Gonzalez Florez, St-Sulpice (CH)

(73) Assignee: Philip Morris Products S.A., Neuchatel (CH)

( * ) Notice: Subject to any disclaimer, the term of this patent is extended or adjusted under 35 U.S.C. 154(b) by 449 days.

(21) Appl. No.: 17/419,938

(22) PCT Filed: Jan. 13, 2020

(86) PCT No.: PCT/EP2020/050657
§ 371 (c)(1),
(2) Date: Jun. 30, 2021

(87) PCT Pub. No.: WO2020/148214
PCT Pub. Date: Jul. 23, 2020

(65) Prior Publication Data
US 2021/0345674 A1 Nov. 11, 2021

(30) Foreign Application Priority Data
Jan. 14, 2019 (EP) .................................... 19151643

(51) Int. Cl.
*A24F 40/46* (2020.01)
*A24D 1/14* (2006.01)
(Continued)

(52) U.S. Cl.
CPC ............... *A24F 40/46* (2020.01); *A24D 1/14* (2013.01); *A24F 1/30* (2013.01); *A24F 40/20* (2020.01);
(Continued)

(58) Field of Classification Search
CPC .......... A24F 40/46; A24F 40/20; A24F 40/42; A24F 1/30; A24D 1/14; H05B 3/0071; G02B 5/10
(Continued)

(56) References Cited

U.S. PATENT DOCUMENTS 7,690,076 B2 * 4/2010 Tannous .................... A24F 1/30
15/330
8,479,746 B1 * 7/2013 Tannous .................... A24F 1/30
15/330
(Continued)

FOREIGN PATENT DOCUMENTS

CA 3021162 A1 * 10/2017 ............. A24F 40/42
CN 103315406 9/2013
(Continued)

OTHER PUBLICATIONS

Office Action issued in Japan for Application No. 2021-539538 dated Feb. 6, 2023 (10 pages). English translation included.
(Continued)

*Primary Examiner* — Peter G Leigh
(74) *Attorney, Agent, or Firm* — Mueting Raasch Group

(57) ABSTRACT

A cartridge for a radiation heated aerosol-generating device. A wall of the cartridge defines a cavity. An aerosol-forming substrate is housed within the cavity. The outer surface of the wall of the cartridge comprises a high emissivity material. The invention further relates to an aerosol-generating device for use with the cartridge, and to an aerosol-generating device or a shisha device comprising the aerosol-generating
(Continued)

device, to a system comprising both the aerosol-generating device and the cartridge, and to a method for forming an aerosol in an aerosol-generating device.

17 Claims, 6 Drawing Sheets

(51) Int. Cl.
*A24F 1/30* (2006.01)
*A24F 40/20* (2020.01)
*A24F 40/42* (2020.01)
*H05B 3/00* (2006.01)
*G02B 5/10* (2006.01)

(52) U.S. Cl.
CPC ........... *A24F 40/42* (2020.01); *H05B 3/0071* (2013.01); *G02B 5/10* (2013.01)

(58) Field of Classification Search
USPC ........................................................ 131/328
See application file for complete search history.

(56) References Cited

U.S. PATENT DOCUMENTS

| | | | |
|---|---|---|---|
| 10,206,429 B2 | 2/2019 | Davis | |
| 10,314,331 B2 | 6/2019 | Poget | |
| 10,842,196 B2 | 11/2020 | Frobisher | |
| 2010/0101592 A1* | 4/2010 | Boldrini | B65B 65/00 131/288 |
| 2011/0079231 A1* | 4/2011 | Borushek | A24F 1/30 131/229 |
| 2017/0020190 A1* | 1/2017 | Chang | H05B 1/0244 |
| 2017/0020193 A1* | 1/2017 | Davis | H05B 3/145 |
| 2018/0027884 A1 | 2/2018 | Zuber | |
| 2018/0249760 A1 | 9/2018 | Kaufman | |
| 2018/0279671 A1* | 10/2018 | Lake | A24F 3/02 |

FOREIGN PATENT DOCUMENTS

| | | | | |
|---|---|---|---|---|
| CN | 103553548 A | * | 2/2014 | |
| CN | 103708807 A | * | 4/2014 | |
| CN | 106455704 A | * | 2/2017 | ............ A24B 15/12 |
| DE | 202015008458 U1 | * | 2/2016 | ............... A24F 1/30 |
| EP | 3 216 357 | | 9/2017 | |
| EP | 3075268 | | 1/2020 | |
| JP | 1976-070230 | | 6/1976 | |
| JP | 1984-118121 | | 7/1984 | |
| JP | 2016-195585 | | 11/2016 | |
| JP | 2018-516560 | | 6/2018 | |
| JP | 2018-528762 | | 10/2018 | |
| JP | 2018-528767 | | 10/2018 | |
| KR | 10-2013-0007621 | | 1/2013 | |
| KR | 10-2018-0044912 | | 5/2018 | |
| WO | WO 2013/098397 | | 7/2013 | |
| WO | WO 2014/102092 | | 7/2014 | |
| WO | WO 2015/177255 | | 11/2015 | |
| WO | WO 2016/019573 | | 2/2016 | |
| WO | WO 2016/178098 | | 11/2016 | |
| WO | WO 2017/055584 | | 4/2017 | |
| WO | WO-2017055584 A1 | * | 4/2017 | ........... A24B 15/167 |
| WO | WO 2017/186946 | | 11/2017 | |
| WO | WO-2017186946 A1 | * | 11/2017 | ............... A24D 1/20 |
| WO | WO 2019/003116 | | 1/2019 | |

OTHER PUBLICATIONS

PCT Search Report and Written Opinion for PCT/EP2020/050657 dated Apr. 3, 2020 (13 pages).
Office Action issued in Japan for Application No. 2021-539538 dated Sep. 12, 2022 (11 pages). English translation included.
Office Action issued in Korea for Application No. 10-2021-7021382 dated Dec. 7, 2022 (13 pages). English translation included.

* cited by examiner

RADIATION HEATED AEROSOL-GENERATING SYSTEM, CARTRIDGE, AEROSOL-GENERATING ELEMENT AND METHOD THEREFOR

This application is a U.S. National Stage Application of International Application No. PCT/EP2020/050657 filed Jan. 13, 2020, which was published in English on Jul. 23, 2020, as International Publication No. WO 2020/148214 A1. International Application No. PCT/EP2020/050657 claims priority to European Application No. 19151643.4 filed Jan. 14, 2019.

The present invention relates to a cartridge for use with an aerosol-generating device. More particularly, this disclosure relates to a cartridge for a radiation heated aerosol-generating device, wherein an aerosol can be generated via heating the cartridge by means of electromagnetic radiation. Aspects of the invention relate to a cartridge, to an aerosol-generating device, to a shisha device to a system comprising both an aerosol-generating device and a cartridge, to a method for forming an aerosol with a cartridge and to a method for forming an aerosol with both a cartridge and an aerosol-generating device.

Traditional shisha devices are used to smoke a shisha tobacco substrate and are configured such that vapor and smoke pass through a water basin before inhalation by a user. Shisha devices may include one outlet or more than one outlet so that the device can be used by more than one user at a time. Use of shisha devices is considered by many to be a leisure activity and a social experience.

Traditional shisha devices employ charcoal to heat or combust the tobacco substrate to generate an aerosol for inhalation by a user. High levels of carbon monoxide and undesired combustion by-products like polycyclic aromatic hydrocarbons as well as other harmful and potentially harmful constituents might be produced during use of a traditional shisha device. The carbon monoxide may be generated by the charcoal as well as by the combustion of the tobacco substrate.

One way to reduce the production of carbon monoxide and combustion by-products is to use electrical heaters instead of charcoal, for example resistive heaters, which heat the tobacco substrate to a temperature sufficient to produce an aerosol from the substrate without combusting the substrate. Resistively heated shisha devices often function in combination with a cartridge housing the substrate. A heating body of a highly conductive material transfers the heat from the resistive heating element to the cartridge comprising the substrate.

However, in comparison to traditional charcoal operated shisha devices, electrically heated devices might suffer from lower total aerosol mass, lower visible aerosol, lower aerosol volume or any combination thereof. The reduction in one or more of these aerosol properties may be particularly pronounced during the first puffs due to poorer contact between the substrate within the cartridge and the heating body. A time taken to heat the substrate until a first puff is available for consumption (TT1P) may be relatively long compared to conventional charcoal heated shisha devices. For example, the heating body may only contact the lateral sides of the cartridge in order to facilitate the insertion of the cartridge into the device. Accordingly, thermal contact between the cartridge and the electrical heating element is reduced. Additionally, there is typically an air gap present between the cartridge and the heating body which reduces the thermal contact. The gap may be required to facilitate easy removal and insertion of the cartridge into the device. This may be particularly helpful for cylindrical shaped cartridges. Even if no gap is intended, one may nevertheless arise due to manufacturing tolerances. However, such an air gap may result in heating inefficiency and thermal lag. For example, an air gap of approximately 0.3 millimeters may introduce a temperature lag of approximately 10 degree Celsius when temperature is measured at the centre of the cartridge.

The need of an additional heating body or interface material in order to transfer the heat from the electrical heating element to the cartridge reduces the degree of freedom in the geometrical design of the device. Moreover, not only the cartridge but also the heating body is heated which requires more energy and increases thermal inertia.

Also, in electrically heated aerosol-generating devices, it is sometimes difficult to accurately measure the temperature, particularly in real-time. An infrared temperature sensor may be used, but such devices must be individually calibrated.

It would be desirable to provide an aerosol-generating device which reduces the production of carbon monoxide and undesired combustion by-products in comparison to traditional charcoal shisha devices.

It would be desirable to provide an aerosol-generating device without the need of a heating body or interface material in physical contact with the cartridge.

It would be desirable to provide an aerosol-generating device in which heating efficiency may be increased.

It would be desirable to provide an aerosol-generating device which enables quick heating with low thermal inertia.

It would be desirable to provide an aerosol-generating device which enables directionality of the energy emission with only little, or even substantially no energy losses.

It would be desirable to provide an aerosol-generating device which enables monitoring the temperature of the cartridge in real-time with an infrared temperature sensor.

In various aspects of the present invention there is provided a cartridge for a radiation heatable aerosol-generating device. In some embodiments, the cartridge is for a radiation heatable shisha device. A wall of the cartridge defines a cavity. An aerosol-forming substrate is housed within the cavity. The outer surface of the wall of the cartridge comprises a high emissivity material.

The cartridge of the present invention may be heated by absorption of electromagnetic radiation. Heating with electromagnetic radiation brings the benefit of high speed, flexibility and efficient heating.

Absorption of electromagnetic radiation allows for direct and contactless heating of the cartridge. The cartridge transfers the heat to the aerosol-forming substrate comprised therein. In contrast to heat conduction or heat convection, radiation transfers energy via electromagnetic waves directly to the irradiated material. As a consequence, there is no requirement for the presence of a medium or "heat carrier" between the heat source and the heated element. This can help to shorten the time required to bring the aerosol-forming substrate to the desired target temperature. Particularly the preheating period, that is the required time until the aerosol-forming substrate comprised in the cartridge has reached operating temperature (TT1P) may be reduced.

An additional advantage of radiation heating is that there is no requirement to match the shape of the heater to the shape of the cartridge. In heat conduction based aerosol generating devices heating efficiency is significantly reduced as the contact area of the cartridge and the heat source is reduced. In the present invention heat is generated by absorption of electromagnetic radiation which is rather independent from the actual shape of the cartridge to be heated. Thus, even complex shapes of cartridges may be used without losing efficiency of heating. Complex cartridge geometries may be desired to satisfy customer demands or for anti-counterfeiting reasons.

The wall of the cartridge defining the cavity may be made of a highly thermally conductive material. The complete body of the cartridge defining the cavity may be made of highly thermally conductive material. The highly thermally conductive material defining the cavity may comprise a metal or a metal alloy. The wall or the body of the cartridge may comprise any one of: aluminium, copper, zinc, nickel, silver, and combinations of one or more thereof. Preferably, the body comprises aluminium.

The thermally conductive material of the cartridge allows for rapid heat distribution within the body of the cartridge, such that the aerosol-forming substrate comprised within the cartridge may be homogeneously heated upon exposure to electromagnetic radiation. The rapid heat distribution in the body of the cartridge allows for homogeneously heating even if not all walls of the cartridge defining the cavity are exposed to the electromagnetic radiation.

In some embodiments, the cartridge comprises one or more material less thermally conductive than aluminium. For example, the body may comprise any suitable thermally stable polymeric material. If the material is sufficiently thin that sufficient heat may be transferred through the body to the aerosol-forming substrate housed therein, despite the body being formed from material that is not particularly relatively thermally conductive.

The cartridge may comprise one or more apertures. In some embodiments, the one or more apertures may be formed in the top and bottom of the body to allow air flow through the cartridge when in use. The cartridge may comprise an alignment feature configured to mate with a complementary alignment feature of a receptacle of an aerosol-generating device to align the apertures of the cartridge with the apertures of the receptacle when the cartridge is inserted into the receptacle.

The apertures in the body of the cartridge may be covered during storage to prevent aerosol-forming substrate stored in the cartridge from spilling out of the cartridge. In addition, or alternatively, the apertures in the body of the cartridge may have dimensions sufficiently small to prevent or inhibit the aerosol-forming substrate from exiting the cartridge. If the apertures are covered, a consumer may remove the cover prior to inserting the cartridge into the receptacle.

The cartridge may be of any suitable shape. Preferably, the cartridge has a frustoconical or cylindrical shape.

The thermal conductivity of the material may be larger than 200 watts per meter and Kelvin and preferably larger than 230 watts per meter and Kelvin.

Thermal conductivity may be determined according to ASTM E1225-13 under standard conditions as mentioned in this ASTM method.

The high emissivity material of the cartridge efficiently absorbs the electromagnetic radiation and converts its radiation energy into heat energy. The higher the thermal emissivity of the material the more incident radiation is absorbed and converted into thermal energy. It is well known that materials with high emissivity properties also show a high absorption of electromagnetic radiation. Thus, the two terms "high emissivity" and "high absorption" are used synonymously herein.

The high emissivity material may have an emissivity of at least 0.85. Preferably, the high emissivity material may have an emissivity of at least 0.9. Emissivity of the high emissivity material may be determined according to ASTM C1371-15 under standard conditions as mentioned in this ASTM method.

The high emissivity material may comprise one or more transition metal oxides and may be selected from one or more of $Cr_2O_3$, $CoO_x$, $Fe_2O_3$, and $NiO$.

Parts of the capsule that in use are to be exposed to electromagnetic radiation may be made from the high emissivity material. The high emissivity material may also be included or incorporated in the thermally conductive material of the cartridge. The thermally conductive material of the capsule may also be doped with high emissivity material.

The high emissivity material may be provided as a layer of material to the outer surface or parts of the outer surface of the cartridge. The high emissivity material may be provided as a coating. The coating may be provided as a continuous coating extending on the outer surface or as one or more patches of coating provided to the outer surface of the cartridge.

Suitable high emissivity coatings may comprise a high emissivity additive and may further comprise a refractory pigment and a binder agent.

The refractory pigment of the coating may be selected from one or more of: zirconia, zirconia silicate, aluminium oxide, aluminium silicate, and silicon oxide.

In some coatings the refractory pigment and the high emissivity additive are the same material.

In an embodiment, the cartridge may be made from a body of aluminum defining a cavity for holding an aerosol-forming substrate. The outer surface of the aluminum cartridge is provided with a high emissivity coating. The complete outer surface of the cartridge may be provided with the high emissivity coating. Preferably at least those portions of the outer surface of the cartridge that are in use exposed to electromagnetic radiation are provided with the high emissivity coating. Such cartridge offers the advantage of absorbing a maximum of the electromagnetic radiation and converting this radiation energy into thermal energy. At the same time the highly conductive aluminum material distributes the thermal energy homogenously within the walls of the cartridge and thereby allows homogenously heating of the aerosol forming material housed within the cartridge.

The term "aerosol-forming substrate" refers to a device or substrate that releases, upon heating, volatile compounds that may form an aerosol to be inhaled by a user. Suitable aerosol-forming substrates may comprise plant-based material. The aerosol-forming substrate may comprise tobacco or a tobacco-containing material containing volatile tobacco flavor compounds, which are released from the aerosol-forming substrate upon heating. In addition, or alternatively, an aerosol-forming substrate may comprise a non-tobacco containing material. The aerosol-forming substrate may comprise homogenized plant-based material. The aerosol-forming substrate may comprise at least one aerosol former. The aerosol-forming substrate may comprise other additives and ingredients such as flavourants. In some embodiments, the aerosol-forming substrate comprises a liquid at room temperature. For example, the aerosol-forming substrate may comprise a liquid solution, suspension, dispersion or the like. In some embodiments, the aerosol-forming substrate comprises a solid at room temperature. For example, the aerosol-forming substrate may comprise tobacco or sugar. Preferably, the aerosol-forming substrate comprises nicotine.

Any suitable aerosol-forming substrate may be used with aerosol-generating devices or cartridges of the invention. The aerosol-forming substrate is preferably a substrate capable of releasing one or more volatile compounds that may form an aerosol. The volatile compounds may be released by heating the aerosol-forming substrate. The aerosol-forming substrate may be solid or liquid or comprise both solid and liquid components. Preferably, the aerosol-forming substrate is solid.

The aerosol-forming substrate may comprise nicotine. The nicotine containing aerosol-forming substrate may comprise a nicotine salt matrix. The aerosol-forming substrate may comprise plant-based material. The aerosol-forming substrate may comprise tobacco, and preferably the tobacco containing material contains volatile tobacco flavour compounds, which are released from the aerosol-forming substrate upon heating.

The aerosol-forming substrate may comprise homogenized tobacco material. Homogenized tobacco material may be formed by agglomerating particulate tobacco. Where present, the homogenized tobacco material may have an aerosol-former content of equal to or greater than 5% on a dry weight basis, and preferably between greater than 30% by weight on a dry weight basis. The aerosol-former content may be less than about 95% on a dry weight basis.

The aerosol-forming substrate may alternatively or additionally comprise a non-tobacco-containing material. The aerosol-forming substrate may comprise homogenized plant-based material.

The aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenized tobacco, extruded tobacco and expanded tobacco.

The aerosol-forming substrate may comprise at least one aerosol-former. The aerosol-former may be any suitable known compound or mixture of compounds that, in use, facilitates formation of a dense and stable aerosol and that is substantially resistant to thermal degradation at the operating temperature of the aerosol-generating element. Suitable aerosol-formers are well known in the art and comprise, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Particularly preferred aerosol formers are polyhydric alcohols or mixtures thereof, such as triethylene glycol, 1,3-butanediol and, most preferred, glycerine. The aerosol-forming substrate may comprise other additives and ingredients, such as flavourants. The aerosol-forming substrate preferably comprises nicotine and at least one aerosol-former. In a particularly preferred embodiment, the aerosol-former is glycerine.

The solid aerosol-forming substrate may be provided on or embedded in a thermally stable carrier. The carrier may comprise a thin layer on which the solid substrate deposited on a first major surface, on second major outer surface, or on both the first and second major surfaces. The carrier may be formed of, for example, a paper, or paper like material, a non-woven carbon fiber mat, a low mass open mesh metallic screen, or a perforated metallic foil or any other thermally stable polymer matrix. Alternatively, the carrier may take the form of powder, granules, pellets, shreds, spaghettis, strips or sheets. The carrier may be a non-woven fabric or fiber bundle into which tobacco components have been incorporated. The non-woven fabric or fiber bundle may comprise, for example, carbon fibers, natural cellulose fibers, or cellulose derivative fibers.

In some embodiments, the aerosol-forming substrate is in the form of a suspension. For example, the aerosol-forming substrate may be in the form of a thick, molasses-like, suspension. The aerosol-forming substrate housed in the cartridge may comprise shisha molasses.

The term "tobacco material" refers to a material or substance comprising tobacco, which comprises tobacco blends or flavoured tobacco, for example.

As used herein, the term "aerosol" as used when discussing a flow of aerosol, may refer to aerosol, air comprising aerosol or vapour, or aerosol-entrained air. Air comprising vapour may be a precursor to air comprising aerosol, for example, after being cooled or after being accelerated.

According to another aspect of the invention there is provided an aerosol-generating element for generating an aerosol in an aerosol-generating device, the aerosol-generating element comprising a photonic device configured to generate electromagnetic radiation, and a receptacle for receiving a cartridge as above described. The aerosol generating element is arranged to heat the aerosol-forming substrate within the cartridge by directing the electromagnetic radiation onto cartridge. In some embodiments, the aerosol-generating element is for generating aerosol in a shisha device.

The photonic device thus acts as an emitter of electromagnetic radiation. Generally, the aerosol-generating element of the invention uses electromagnetic radiation to heat the body of the cartridge comprising the aerosol-forming substrate.

The aerosol-generating element of the invention therefore provides an alternative heating system, wherein the cartridge housing the aerosol-forming substrate is heated by absorption of electromagnetic radiation. Heating with electromagnetic radiation brings the benefit of high speed, flexibility and efficient heating.

In contrast to conduction or convection, radiation transfers energy via electromagnetic waves. As a consequence there is no requirement for the presence of a medium or "heat carrier". This can help to shorten the time required to bring the aerosol-forming substrate to the desired temperature. This can be particularly beneficial during a period of pre-heating the aerosol-forming substrate. Moreover, no physical contact between the aerosol-generating element and the cartridge comprising the aerosol-forming substrate is needed. The aerosol-generating element of the invention allows contactless heating of the cartridge.

The aerosol-generating element may be used with an aerosol-forming substrate to produce aerosol. In particular, the aerosol-generating element may receive and heat the aerosol-forming substrate to generate aerosol. The aerosol-forming substrate may be heated, but not burned, by the aerosol-generating element. The aerosol-generating element may comprise an additional heating element. The additional heating element may comprise an electric heating element.

In some embodiments, the aerosol-generating element may comprise features of a conventional shisha device, such as any of: a bowl or a receptacle for receiving an aerosol-forming substrate, a cover plate for covering the bowl or receptacle, foil for covering the bowl, and at least one charcoal pellet for heating the aerosol-forming substrate.

The high emissivity materials of the cartridge may efficiently absorb the electromagnetic radiation. Accordingly, the aerosol-generating element of the invention allows for targeted heating of the cartridge. In this regard the radiation spectrum of the photonic device may be adapted to the high emissivity materials used for manufacture of the capsule. The electromagnetic radiation does not necessarily heat the surrounding air. This means more efficient heating can be achieved. Also, more design freedom is available, since an air gap does not cause large thermal losses as in a conventional electrically heated shisha system. Thus, potentially less insulating material is necessary. With the heating means of the present invention a cartridge may be heated up to a target temperature of 200 degrees Celsius within 60 seconds. This is considerably faster than what is possible with conventional resistive heating means.

In some embodiments the photonic device may be configured to generate a beam of electromagnetic radiation. The aerosol-generating element may be arranged to heat the aerosol-forming substrate within the cartridge by directing the beam of electromagnetic radiation onto the cartridge. Electromagnetic beams can be manipulated to irradiate only a specific part of the cartridge. Accordingly, the aerosol-generating element of the invention allows for targeted heating of the cartridge as a function of space.

Another advantage of the electromagnetic heating means of the present invention is fast thermal response. The cartridge comprising the aerosol-forming substrate may be substantially heated during the time of irradiation, only.

Also, heating by electromagnetic radiation provides high flexibility to the spatial arrangement of the electromagnetic emitter and the cartridge. This opens a wide scope of options to the geometrical design of the aerosol-generating element and the shisha device.

In some embodiments, the electromagnetic beam may undergo manipulation between the photonic device and the cartridge. In some embodiments, manipulation of an electromagnetic beam is preferably facilitated by means of an optical element.

In some embodiments, the aerosol-generating element further comprises an optical element being located between the photonic device and the receptacle and being configured to manipulate the beam of electromagnetic radiation.

The term "manipulation of the beam of electromagnetic radiation" may comprise any changes in a light path of a beam of electromagnetic radiation. Examples include any of reflecting an electromagnetic beam, deflecting an electromagnetic beam, converging an electromagnetic beam, and diverging an electromagnetic beam.

The term "optical element" comprises any element which is capable of manipulating the beam of electromagnetic radiation. Examples comprise mirrors, curved mirrors, lenses, convex lenses and concave lenses. Concave lenses may diverge the electromagnetic beam and thus may lower the energy density of the electromagnetic beam. Such a configuration may be particularly useful to maintain the substrate at a predetermined lower temperature for long time intervals where no puffing occurs, for example in the preheat phase or in between puffs. Convex lenses may converge the electromagnetic beam and thus may increase the energy density of the electromagnetic beam. A converged, or focused, beam may allow a rapid heating of specific areas of the cartridge.

According to one or more embodiments, the optical element of the aerosol-generating element of the invention may be arranged on an optical mount. The optical mount may be moveable. The movement of the optical mount may be executed mechanically, electrically, or electromechanically. Movement may be accomplished by any suitable means. Examples may comprise stepper motors, eccentric screws, or both stepper motors and eccentric screws. Movement may be executed manually by a user. Preferably, movement is executed automatically by means of electronically controlled components.

A position of the optical element may be adjustable during use by the optical mount. The optical element arranged on the optical mount allows for manipulating the beam of electromagnetic radiation. The optical element arranged on the optical mount allows for dynamically manipulating the beam of electromagnetic radiation.

The term "movable optical mount" comprises any kind of mount of the optical element which allows moving the optical element into different positions or directions relative to the incident electromagnetic beam. Thereby, the manipulation of the electromagnetic beam caused by the optical element may be altered by moving the optical element via the movable optical mount.

The term "dynamically manipulating the beam of electromagnetic radiation" means that the beam of electromagnetic radiation may be manipulated during use of the aerosol-generating element in an aerosol-generating device.

The term "during use" may refer to any instant of time when a user operates the aerosol-generating device. "During use" may refer to any instant of time when the aerosol-generating device is switched on. "During use" may refer to any instant of time when power is supplied to the photonic device. "During use" may refer to an instant of time during a puff or between puffs.

Manipulation of the electromagnetic beam may be executed via the movable optical mount. Mechanically, electronically, or electromechanically, movement may be accomplished by any suitable means. Examples may comprise stepper motors, eccentric screws, or both stepper motors and eccentric screws. Movement may be executed manually by a user. Preferably, movement is executed automatically by means of electronically controlled components.

Generally, progress of the dynamic manipulation of the electromagnetic beam may be controlled by a computer program operating on an electronic circuitry. A part of the dynamic manipulation or the entire dynamic manipulation may be controlled automatically, for example, according to a computer program. The computer program may be stored on non-transitory computer readable medium. One or more aspects of the dynamic manipulation may be partly or entirely controllable by a user. For example, a user may control a pace of the dynamic manipulation. A user may control a location of the substrate to which the electromagnetic beam is guided. For example, a means may be included which allows for a user to enter commands and to thereby dynamically manipulate the electromagnetic beam according to her or his preferences. Such means may be any suitable means as known to a person skilled in the art. An example is a control unit comprising a user interface. In some embodiments, the user interface may comprise electronic or mechanical or electromechanical user interface means.

The photonic device of the aerosol-generating element functions as an electromagnetic emitter. The electromagnetic emitter may be selected in view of one or more electromagnetic emitter properties. One or more electromagnetic emitter properties may be selected in dependence on one or more of the high emissivity materials used for manufacturing of the cartridge. For example, said one or more electromagnetic emitter properties may comprise any one or combination of: wavelength, frequency, spot size, swept source, pulsed vs continuous wave, energy and power.

The emitted electromagnetic radiation may be any of UV radiation, IR radiation or visible light. The wavelength of the electromagnetic emitter may range from 100 nanometers to 10 micrometers, preferably from 500 nanometers to 50 micrometers and more preferably from 700 nanometers to 3 micrometers. The photonic device used and the electromagnetic wavelength emitted by the photonic device may be chosen depending on technology maturity and competitive market prices.

The term "a wavelength" may refer to a single wavelength, a plurality of single wavelengths, a range of wavelengths, a plurality of ranges of wavelengths, or any combination thereof.

In some embodiments, the electromagnetic emitter may emit electromagnetic radiation at a power in the range of from 0.1 Watt to 30 Watts, preferably from 0.5 Watt to 25 Watts, more preferably from 1 Watt to 20 Watts, and more preferably from 1 Watt to 3 Watts. In some embodiments, a relatively high power of between 1 to 20 Watts is used for pre-heating the aerosol-forming substrate. In some embodiments, a relatively lower power of between 1 and 3 Watts is used for puff on demand that is during continuous use of the shisha device.

The total output power can be generated by a single photonic device. In some embodiments more than one photonic device may be used. The above indicated power ranges correspond to the total output power generated by the photonic devices. Thus, the more photonic devices are used, the less output power needs to be generated by the individual photonic devices. The optimum number of photonic devices may depend on the cost considerations, design constraints and power limitations of the photonic devices.

In some embodiments, the energy density of the beam of electromagnetic radiation may be in a range of from 0.010 Watt per square centimeter to 30 Watts per square centimeter, preferably from 0.050 Watt per square centimeter to 6 Watts per square centimeter, and more preferably from 0.100 Watts per square centimeter to 3 Watts per square centimeter.

In some embodiments, the diameter of the beam of electromagnetic radiation may be in the range of from 1 millimeter to 110 millimeters, preferably from 2 millimeters to 100 millimeters, and more preferably from 5 millimeters to 80 millimeters.

The term "diameter of the electromagnetic beam" may refer to the diameter of the area of the cartridge which is directly irradiated by the beam of electromagnetic radiation. The distance between the electromagnetic emitter and the cartridge may be up to 30 centimeters, preferably up to 20 centimeters, and more preferably up to 10 centimeters. Efficiency of heating may be increased the closer the electromagnetic emitter is located to the heated cartridge.

In some embodiments, the electromagnetic emitter may comprise an electroluminescence based emitter, such as, but not limited to, a laser, a laser diode, a light emitting diode or a superluminescent diode. Suitable electroluminescent devices are light emitting diodes operating at wavelengths of between 320 and 660 nanometers.

In some embodiments, the electromagnetic emitter may comprise an incandescence based emitter, such as, but not limited to, a halogen lamp or a quartz lamp. For suitable incandescence based light sources the operating temperature may range between 1000 and 3400 Kelvin.

The photonic device of the invention may be used as the only heating means for heating the aerosol-forming substrate. In some embodiments, the photonic device of the invention may comprise one or more additional heating means. Any heating means may be used as an additional heating means. Examples comprise electrical heating means, such as a resistive heating means, inductive heating means or a combination of both a resistive heating means and an inductive heating means.

In one or more embodiments, the aerosol-generating element may additionally comprise an additional heating means, such as an electrical heating means, configured for heating the aerosol-forming substrate received in the receptacle. The additional electrical heating means may be in thermal contact with the receptacle. In one or more embodiments, at least a part of the receptacle may be formed by the additional electrical heating means.

The additional heating means comprises a resistive heating means. For example, the additional heating means may comprise one or more resistive wires or other resistive elements. The resistive wires may be in contact with a thermally conductive material to distribute heat produced over a broader area. Examples of suitable conductive materials include aluminium, copper, zinc, nickel, silver, and combinations thereof. For purposes of this disclosure, if resistive wires are in contact with a thermally conductive material, both the resistive wires and the thermally conductive material are part of the heating means that forms at least a portion of the surface of the receptacle.

In some examples, an additional heating means comprises an inductive heating means. For example, the additional heating means may comprise a susceptor material that forms a surface of the receptacle. As used herein, the term 'susceptor' refers to a material that is capable to convert electromagnetic energy into heat. When located in an alternating electromagnetic field, typically eddy currents are induced and hysteresis losses may occur in the susceptor causing heating of the susceptor. As the susceptor is located in thermal contact or close thermal proximity with the aerosol-forming substrate, the substrate is heated by the susceptor such that an aerosol is formed. Preferably, the susceptor is arranged at least partially in direct physical contact with the aerosol-forming substrate or the cartridge containing the aerosol-forming substrate.

The susceptor may be formed from any material that can be inductively heated. Preferably, the susceptor may be formed from any material that can be inductively heated to a temperature sufficient to generate an aerosol from the aerosol-forming substrate. Preferred susceptors comprise a metal or carbon. A preferred susceptor may comprise or consist of a ferromagnetic material, for example ferritic iron, a ferromagnetic alloy, such as ferromagnetic steel or stainless steel, and ferrite. A suitable susceptor may be, or comprise, aluminium.

Preferred susceptors are metal susceptors, for example stainless steel. However, susceptor materials may also comprise or be made of graphite, molybdenum, silicon carbide, aluminium, niobium, Inconel alloys (austenite nickel-chromium-based superalloys), metallized films, ceramics such as for example zirconia, transition metals such as for example Fe, Co, Ni, or metalloids components such as for example B, C, Si, P, Al.

A susceptor preferably comprises more than 5%, preferably more than 20%, preferably more than 50% or 90% of ferromagnetic or paramagnetic materials. Preferred susceptors may be heated to a temperature in excess of 250 degrees Celsius. Suitable susceptors may comprise a non-metallic core with a metal layer disposed on the non-metallic core, for example metallic tracks formed on a surface of a ceramic core.

The aerosol-generating device may also comprise one or more induction coils configured to induce eddy currents and/or hysteresis losses in a susceptor material, which results in heating of the susceptor material. A susceptor material may also be positioned in the cartridge containing the aerosol generating substrate. A susceptor element comprising the susceptor material may comprise any suitable material, such as those described in, for example, PCT Published Patent Applications WO 2014/102092 and WO 2015/177255.

The additional heating means, whether an inductive heating means or a susceptor, may be thermally coupled with a heating block. The additional heating means may be in direct contact with the heating block. The heating block may comprise any suitable thermally conductive material. In some embodiments, the heating block comprises aluminium, alumina, or an alumina ceramic. The heating block may form the exterior surface of the additional heating means.

The additional heating means may comprise an internal resistive or inductive heating element or an external heating element, or both internal and external heating elements, where "internal" and "external" refer to the relative position of the heating element with respect to the aerosol-forming substrate in use. An internal heating element may take any suitable form. For example, an internal heating element may take the form of a heating blade. Alternatively, the internal heater may take the form of a casing or substrate having different electro-conductive portions, or an electrically resistive metallic tube. Alternatively, the internal heating element may be one or more heating needles or rods that in use run through the center of the aerosol-forming substrate. Other alternatives include a heating wire or filament, for example a Ni—Cr (Nickel-Chromium), platinum, tungsten or alloy wire or a heating plate. Optionally, the internal heating element may be deposited in or on a rigid carrier material. In one such embodiment, the electrically resistive heating element may be formed using a metal having a defined relationship between temperature and resistivity. In such an exemplary device, the metal may be formed as a track on a suitable insulating material, such as ceramic material, and then sandwiched in another insulating material, such as a glass. Heaters formed in this manner may be used to both heat and monitor the temperature of the heating elements during operation. The aerosol-generating element may heat the aerosol-forming substrate by the above mentioned heating means to generate an aerosol. In some embodiments, the aerosol-forming substrate is preferably heated, to a temperature in a range from about 150° C. to about 350° C.; more preferably from about 180° C. to about 250° C. or from about 200° C. to about 230° C.

The aerosol-generating element comprises a receptacle for receiving the cartridge as above described. The receptacle may comprise any suitable number of apertures in communication with one or more air inlet channels of the aerosol-generating device. In some embodiments, the receptacle may comprise 1 to 1000 apertures, such as 1 to 500 apertures. The apertures may be of uniform size or non-uniform size. The apertures may be of uniform or non-uniform shape. The apertures may be uniformly distributed or non-uniformly distributed. The apertures may be formed in the receptacle at any suitable location. For example, the apertures may be formed in one or both of a top or a bottom of the receptacle. Preferably, the apertures are formed in the bottom of the receptacle.

If the top of the receptacle comprises one or more apertures, at least some of the apertures in the top of the receptacle may be arranged to align with at least some of the apertures in the top of the cartridge when the cartridge is received in the receptacle.

In some embodiments, the aerosol-generating element is configured to puncture the cartridge to form apertures in the cartridge. In some embodiments, the receptacle of the aerosol-generating element is configured to puncture the cartridge to form apertures in the cartridge.

The receptacle is preferably shaped and sized to allow contact between one or more walls or ceiling of the receptacle and the cartridge comprising the aerosol-forming substrate when the cartridge is received by the receptacle. Advantageously, this facilitates conductive heating of the aerosol-forming substrate by an additional external heating element.

Preferably, the interior of the receptacle and the exterior of a cartridge comprising the aerosol-forming substrate are of similar size, shape and dimensions. Preferably, the interior of the receptacle has a height to a base width (or diameter) ratio of greater than about 1.5 to 1. Preferably, the exterior of the cartridge has a height to a base width (or diameter) ratio of greater than about 1.5 to 1. Such ratios may allow for more efficient depletion of the aerosol-forming substrate within the cartridge during use by allowing heat to penetrate to the middle of the cartridge. For example, the receptacle and cartridge may have a base diameter (or width) about 1.5 to about 5 times the height, or about 1.5 to about 4 times the height, or about 1.5 to about 3 times the height. Similarly, the receptacle and cartridge may have a height about 1.5 to about 5 times the base diameter (or width), or about 1.5 to about 4 times the base diameter (or width), or about 1.5 to about 3 times the base diameter (or width). Preferably, the receptacle and cartridge have a height to base diameter ratio or base diameter to height ratio of from about 1.5 to 1 to about 2.5 to 1.

In some embodiments, the interior of the receptacle and the exterior of the cartridge each have a base diameter in a range from about 15 mm to about 30 mm and a height in a range from about 40 mm to about 60 mm.

The receptacle may be formed from one or more parts. Preferably, the receptacle is formed by two or more parts. At least one part of the receptacle may be movable relative to another part of the receptacle to allow access to the interior of the receptacle for inserting the cartridge into the receptacle. For example, one part of the receptacle may be removably attachable to another part of the receptacle to allow insertion of the cartridge housing the aerosol-forming substrate when the receptacle parts are separated. The receptacle parts may be attachable in any suitable manner, such as through threaded engagement, interference fit, snap fit, magnetic connection, or the like. In some embodiments, the receptacle parts are attached to one another via a hinge. When the receptacle parts are attached via a hinge, the receptacle parts may also comprise a locking mechanism to secure the receptacle parts relative to one another when the receptacle is in a closed position. In some embodiments, the receptacle comprises a drawer which may be slid open to allow the cartridge to be placed into the drawer and which may be slid closed to allow the shisha device to be used.

According to another aspect of the invention there is provided an aerosol-generating device for use with a cartridge as above described. The aerosol-generating device comprises the aerosol-generating element as above described. In some embodiments, the aerosol-generating device is a shisha device. In one or more embodiments, the shisha device may further comprise an airflow conduit and a liquid vessel.

In use, the generated aerosol may flow through an airflow conduit. The airflow conduit may also be referred to herein as a stem pipe. The airflow conduit comprises a proximal end portion defining a proximal opening positioned to receive airflow from the aerosol-generating element. The airflow conduit comprises a distal end portion defining a distal opening positioned in an interior of a vessel. The vessel is configured for receiving a liquid therein, up to a liquid fill level. The airflow conduit is in fluid communication with the vessel. An airflow channel may be defined between the aerosol-generating element and the interior of the vessel. In particular, the aerosol-generating element is in fluid communication with the vessel, by means of the airflow conduit. The interior of the vessel comprises a lower volume for receiving liquid and an upper volume for head space. The vessel comprises a head space outlet in fluid communication with the upper volume of the vessel, above the liquid fill level. In some embodiments, a hose may be connected to the head space outlet. A mouthpiece may be coupled to the hose for puffing on by a user of the shisha device.

The vessel may be optically opaque, or may include an optically transparent housing or housing portion to allow a consumer to observe contents in the vessel. The vessel may include a liquid fill demarcation, such as a liquid fill line. The vessel housing may be formed of any suitable material. For example, the vessel housing may include glass or suitable rigid plastic material. Preferably, the vessel is removable from a portion of the shisha device having the aerosol-generation element. This advantageously makes it easier for a consumer to fill or clean the vessel.

The vessel may be filled to a liquid fill level. The liquid preferably comprises water. The liquid may optionally be infused with one or more colorants, flavourants, or colorant and flavourants. For example, the liquid may be infused with one or both of botanical or herbal infusions. In some embodiments, the aerosol may be altered by being pulled through the liquid.

Air may be flowed through the aerosol-generating element to draw aerosol from the aerosol-generating element through an airflow conduit. The airflow conduit may define an airflow channel. Airflow may exit the shisha device through a head space outlet of the vessel. Air may flow through the airflow conduit by application of a negative pressure at the head space outlet. The source of negative pressure may be suction or puffing of a user. In response, aerosol may be drawn through the airflow conduit, through the liquid housed in the interior of the vessel. The user may suction a mouthpiece in fluid communication with the head space outlet to generate or provide the negative pressure at the head space outlet or mouthpiece. In some embodiments, airflow may enter an aerosol-forming substrate receptacle of the shisha device, flow along or across the aerosol-forming substrate, and may become entrained with aerosol. Aerosol-entrained air may then flow from an outlet in the receptacle through the airflow conduit, to the vessel.

As used herein, the term "downstream" refers to a direction along the airflow conduit toward the interior of the vessel from the aerosol-generating element. The term "upstream" refers to a direction opposite to the downstream direction or a direction along the airflow conduit toward the aerosol-generating element from the interior of the vessel.

The airflow conduit is positioned between the aerosol-generating element and the interior of the vessel. The airflow conduit may comprise one or more components along the airflow conduit. The airflow conduit comprises a proximal end portion defining a proximal opening positioned to receive airflow from the aerosol-generating element. The airflow conduit comprises a distal end portion defining a distal opening positioned in the interior of the vessel. The distal end portion of the airflow conduit may extend into a volume of liquid in the interior of the vessel during use of the shisha device.

The airflow conduit may be described as defining a longitudinal axis extending through the proximal end portion and the distal end portion. A lateral direction may be defined orthogonal to the longitudinal axis. For example, a cross-section, circumference, width, or diameter of the airflow conduit may be defined in the lateral direction, or in a plane orthogonal to the longitudinal axis.

The housing of the shisha device may comprise one or more air inlets through which air may enter the shisha device. The air may be guided from the air inlets along an airflow pathway to the receptacle and may further be guided through the airflow conduit towards the interior of the vessel. In some embodiments the airflow path has a first portion which extends from the housing air inlet to the photonic device and a second portion which extends from the photonic device to the receptacle. Photonic devices may heat up during use. By guiding the relatively cool ambient air from an ambient environment, through the housing air inlets to the photonic device, hot air surrounding the photonic device may be removed or displaced upon puffing and re-directed to pass through the cartridge. In this way the waste heat produced by the photonic device is efficiently used to further heat the aerosol-forming substrate. At the same time the photonic device is cooled by the ambient air such that optimal performance of the photonic device is ensured.

The aerosol-generating device may comprise control electronics configured to control heating and operation of the aerosol-generating device. The control electronics may be provided in any suitable form. The control electronics may comprise a controller. The control electronics may comprise a memory. The memory may comprise instructions that cause one or more components of the aerosol-generating device to carry out a function or aspect of the control electronics. Functions attributable to control electronics in this disclosure may be embodied as one or more of software, firmware, and hardware. The memory may be a non-transient computer readable storage medium.

In particular, one or more of the components, such as controllers, described herein may comprise a processor, such as a central processing unit (CPU), computer, logic array, or other device capable of directing data coming into or out of the control electronics. The controller may comprise one or more computing devices having memory, processing means, and communication hardware. The controller may comprise circuitry used to couple various components of the controller together or with other components operably coupled to the controller. The functions of the controller may be performed by hardware. The functions of the controller may be performed by instructions stored on a non-transient computer readable storage medium. The functions of the controller may be performed by both hardware and by instructions stored on a non-transient computer readable storage medium.

Where the controller comprises a processor, the processor may, in some embodiments, comprise any one or more of a microprocessor, a microcontroller, a digital signal processor (DSP), an application specific integrated circuit (ASIC), a field-programmable gate array (FPGA), and equivalent discrete or integrated logic circuitry. In some embodiments, the processor may comprise multiple components, such as any combination of one or more microprocessors, one or more controllers, one or more DSPs, one or more ASICs, and one or more FPGAs, as well as other discrete or integrated logic circuitry. The functions attributed to the controller or processor herein may be embodied as software, firmware, hardware, or any combination thereof. While described herein as a processor-based system, an alternative controller could utilize other components such as relays and timers to achieve the desired results, either alone or in combination with a microprocessor-based system.

In one or more embodiments, the exemplary systems, methods, and interfaces may be implemented using one or more computer programs using a computing apparatus, which may comprise one or more processors, memory, or both memory and one or more processors. Program code, logic or both code and logic described herein may be applied to input data or information to perform functionality described herein and generate desired output data/information. The output data or information may be applied as an input to one or more other devices or methods as described herein or as would be applied in a known fashion. In view of the above, it will be readily apparent that the controller functionality as described herein may be implemented in any manner known to one skilled in the art.

In some embodiments, the control electronics may comprise a microprocessor, which may be a programmable microprocessor. The electronic circuitry may be configured to regulate a supply of power. The electronic circuitry may be configured to generate control signals to activate the photonic device for generating electromagnetic radiation.

In some embodiments, the control electronics may be configured to control the supply of power to the photonic device depending on the temperature of the cartridge. In this manner, the control electronics may regulate the temperature of the resistive element.

The aerosol-generating device may comprise a temperature sensor. The temperature sensor may be an IR temperature sensor. The photonic device, which is used to emit electromagnetic radiation for heating the cartridge, may also be used as an IR temperature sensor. By using the photonic device for emitting radiation and also for monitoring the temperature of the cartridge, a particularly compact design of the device may be achieved.

The temperature sensor may comprise a thermocouple. The temperature sensor may be operably coupled to the control electronics to control the temperature of the cartridge. The temperature sensor may be positioned in any suitable location. For example, the temperature sensor may be configured to insert into the aerosol-forming substrate or a cartridge received within the receptacle to monitor the temperature of the aerosol-forming substrate being heated. In addition, or alternatively, the temperature sensor may be positioned to detect temperature at an aerosol outlet of the aerosol-generating device, such as the aerosol outlet of the aerosol-generating element. In addition, or alternatively, the temperature sensor may be in contact with a cooling element, such as the heated side of the heat pump. The sensor may transmit signals regarding the sensed temperature to the control electronics, which may adjust output of the photonic device to achieve a suitable temperature at the sensor.

Any suitable thermocouple may be used, such as a K-type thermocouple. The thermocouple may be placed in the cartridge where the temperature is lowest. For example, the thermocouple may be placed in the centre, or middle, of the cartridge.

Regardless of whether the aerosol-generating device comprises a temperature sensor, the device is preferably configured to heat an aerosol-forming substrate received in the receptacle to an extent sufficient to generate an aerosol without combusting the aerosol-forming substrate.

The control electronics may be operably coupled to a power supply of the aerosol-generating device. The aerosol-generating device may comprise any suitable power supply. For example, a power supply of an aerosol-generating device may be a battery or set of batteries (such as a battery pack). In some embodiments, one or more than one component of the battery, such as the cathode and anode elements, or even the entire battery may be adapted to match geometries of a portion of an aerosol-generating device in which they are disposed. In some cases, the battery or battery component may be adapted by rolling or assembling to match geometries. The batteries of power supply unit may be rechargeable. The batteries of the power supply may be removable and replaceable. Any suitable battery may be used. For example, heavy duty type or standard batteries existing in the market, such as used for industrial heavy duty electrical power-tools. Alternatively, the power supply unit comprise be any type of electric power supply comprising a super or hyper-capacitor. In some embodiments, the aerosol-generating device may be connectable to an external electrical power source, and electrically and electronically designed for such purpose. Regardless of the type of power supply employed, the power supply preferably provides sufficient energy for the normal functioning of the shisha device for at least approximately 30 minutes, preferably at least approximately 50 minutes, more preferably for at least approximately 70 minutes of continuous operation of the device, before being recharged or needing to connect to an external electrical power source.

The shisha device may comprise an accelerating element. Aerosol-entrained air may depressurize upon passing through one or more accelerating elements. The aerosol-entrained air then continues through a stem pipe, into the vessel, and then may be inhaled by the user. The accelerating element may be positioned along the airflow conduit, such as along the airflow channel of the airflow conduit. In particular, the accelerating element may be positioned along the airflow conduit. The accelerating element may integrally form part of the airflow channel or airflow conduit. The accelerating element may be configured to accelerate aerosol that flows through the accelerating element.

The shisha device may comprise a cooling element. The cooling element may be disposed along the airflow channel or airflow conduit. The cooling element may integrally form part of the airflow channel or airflow conduit. The cooling element is configured to cool aerosol in the airflow channel, particularly air that flows through or past the cooling element. The cooling element may be disposed downstream from the aerosol-generating element along the airflow channel. In particular, the cooling element may be disposed between the aerosol-generating element and the end of the airflow channel, or at least between the aerosol-generating element and the vessel. Further, the cooling element may be positioned adjacent to, or as close as possible, to a deceleration chamber, or deceleration portion of the stem pipe, which may promote rapid cooling for aerosol production. The cooling element may utilize passive cooling, active cooling, or both. The cooling element may comprise a conduit of thermally conductive material.

According to yet another aspect of the invention there is provided an aerosol-generating system comprising the aerosol-generating device of the invention, as above described and a cartridge comprising aerosol-forming substrate, as above described. Generally, the cartridge is a consumable which is removably mountable in the receptacle of the aerosol generating-element of the aerosol-generating device.

According to yet another aspect of the invention there is provided an aerosol-generating system comprising the aerosol-generating device or the shisha device of the invention, as above described, and a cartridge comprising aerosol-forming substrate, as above described. Generally, the cartridge is a consumable which is removably mountable in the receptacle of the aerosol generating-element of the aerosol-generating device or the shisha device.

According to another aspect of the invention, there is provided a method for forming an aerosol in an aerosol-generating device. According to the method electromagnetic radiation is generated by means of a photonic device. Further, the electromagnetic radiation is directed from the photonic device along an optical path to a cartridge comprising an aerosol-forming substrate. Finally, the aerosol-forming substrate is heated by means of the electromagnetic radiation. Consequently, the temperature of the aerosol-forming substrate increases upon absorption of the electromagnetic light. The temperature of the aerosol-forming substrate comprised in the cartridge may increase upon absorption of the electromagnetic light by the cartridge until it reaches the vaporization temperature at which an aerosol is formed. In some embodiments of the method, the aerosol-generating device is a shisha device.

In one or more embodiments of the method, the electromagnetic radiation is a beam of electromagnetic radiation and the method comprises manipulating the beam of electromagnetic radiation prior to heating the cartridge by means of the beam of electromagnetic radiation. In some embodiments of the method, manipulating the beam of electromagnetic radiation comprises using one or more optical elements to manipulate the electromagnetic beam of radiation. In some embodiments, the one or more optical elements may be provided on a movable mount. Different portions of the aerosol-forming substrate may therefore be selectively heated, for example, in a sequential manner.

In some embodiments of the method, the method comprises, manipulating the beam of electromagnetic radiation dynamically. In some embodiments, said dynamic manipulation may be achieved by means of a movable mount of the optical element, such that different portions of the aerosol-forming substrate are selectively heated, for example, in a sequential manner.

For purposes of example, one method for using a shisha device as described herein is provided below in chronological order. The vessel may be detached from other components of the shisha device and filled with water. One or more of natural fruit juices, botanicals, and herbal infusions may be added to the water for flavouring. The amount of liquid added should cover a portion of the main airflow conduit but should not exceed a fill level mark that may optionally exist on the vessel. The vessel is then reassembled to the shisha device. A portion of the aerosol-generating element may be removed or opened to allow the cartridge to be inserted into the receptacle. The aerosol-generating element is then reassembled or closed. The device may then be turned on. A user may puff from a mouth piece until a desired volume of aerosol is produced to fill the chamber having the air-accelerating inlet. The user may puff on the mouth piece as desired. The user may continue using the device until no more aerosol is visible in the chamber. In some embodiments, the device will automatically shut off when the cartridge is depleted of usable aerosol-forming substrate. Alternatively, or in addition, the consumer may refill the device with a fresh cartridge after, for example, receiving the cue from the device that the consumables are depleted or nearly depleted. If refilled with a fresh cartridge, the device may continue to be used. Preferably, the shisha device may be turned off at any time by a consumer by, for example, switching off the device.

In some examples, a user may activate one or more photonic devices by using an activation element. The activation element may be, for example, provided on or adjacent the mouthpiece. The activation element may be, for example, in wireless communication with the control electronics and may signal control electronics to activate the photonic device from standby mode to partial or full irradiation. In some embodiments, such manual activation is only enabled while the user puffs on the mouthpiece to prevent overheating or unnecessary heating of aerosol-forming substrate in the cartridge.

In some examples, the mouthpiece comprises a puff sensor. The puff sensor may be in wireless communication with the control electronics and puffing on the mouthpiece by a consumer causes activation of the photonic device from a standby mode to full irradiation.

A shisha device of the invention may have any suitable airflow management. In one example, puffing action from the user will create a suction effect causing a low pressure inside the device which will cause external air to flow through air inlet of the device, into the air inlet channel, and into the receptacle of the aerosol-generating element. The air may then flow through the cartridge housing the substrate in the receptacle to carry aerosol through the aerosol outlet of the receptacle. The aerosol then may flow into a first aperture of the air-accelerating inlet of the chamber (unless the outlet of the aerosol-generating element also serves as the air-accelerating inlet of the chamber). As the air entrained with aerosol flows through the inlet of the chamber the air is accelerated. The accelerated aerosol-entrained air exits the inlet through a second aperture to enter the main chamber of the chamber, where the aerosol-entrained air is decelerated. Deceleration in the main chamber may improve nucleation or expansion or both nucleation and expansion of the aerosol, leading to enhanced visible aerosol. The aerosol-entrained air then may exit the chamber and flow through the main conduit (unless the main conduit is the main chamber of the chamber) to the liquid inside the vessel. The aerosol will then bubble out of the liquid and into head space in the vessel above the level of the liquid, out the headspace outlet, and through the hose and mouthpiece for delivery to the consumer. The flow of air and the flow of the aerosol inside the shisha device may be driven by the action of puffing from the user.

The method may comprise directing ambient air along a first portion of an airflow-pathway from an air inlet of the shisha device to the photonic device so as to cool the photonic device by means of the ambient air and so as to pre-heat the ambient air. The method may further comprise directing the pre-heated ambient air from the photonic device to the cartridge. By guiding the cool ambient air from an ambient environment, through the air inlets to the photonic device, hot air surrounding the photonic device may be removed or displaced upon puffing and re-directed to pass through the cartridge. In this way the waste heat produced by the photonic device is efficiently used to further heat the aerosol-forming substrate. At the same time the photonic device is cooled by the ambient air such that optimal performance of the photonic device is ensured.

Assembly of all main parts of the shisha device of the invention assures hermetic functioning of the device. Hermetic function should assure that proper air flow management occurs. Hermetic functioning may be achieved in any suitable manner. For example, seals such as sealing rings and washers may be used to ensure hermetic sealing.

Sealing rings and sealing washers or other sealing elements may be made of any suitable material or materials. For example, the seals may include one or more of graphene compounds and silicon compounds. Preferably, the materials are approved for use in humans by the U.S. Food and Drug Administration.

Main parts, such as the chamber, the main airflow conduit from the chamber, a cover housing of the receptacle, and the vessel may be made of any suitable material or materials. For example, these parts may independently be made of glass, glass-based compounds, polysulfone (PSU), polyethersulfone (PES), or polyphenylsulfone (PPSU). Preferably, the parts are formed of materials suitable for use in standard dish washing machines.

In some examples, a mouthpiece of the invention incorporates a quick coupling male/female feature to connect to a hose unit. This enables replacement of the mouthpiece.

The electronic radiation heated shisha device may operate as follows. A cartridge housing an aerosol-forming substrate may be heated by electromagnetic radiation. To this end the aerosol generating element directs electromagnetic radiation onto the cartridge. The aerosol generating element may be configured such that the temperature provided is sufficient to generate an aerosol without combusting, or burning, the aerosol-forming substrate. A user may draw air from the electric shisha, air may enter via an air inlet channel, pass the cooling element, go along a cartridge, then toward a bottom of the cartridge, then to a bottom of the receptacle. The generated aerosol may be accelerated while passing through an accelerating element. Before or during acceleration, the generated aerosol may be cooled by the cooling element to increase condensation in the aerosol. The aerosol may experience a pressure change upon entering a chamber and expand inside the chamber, which may decelerate the aerosol, before passing through a main airflow conduit, or stem pipe, that is partly immersed in water in a lower volume of a vessel. The generated aerosol passes through the water and expands in an upper volume of the vessel before being extracted by a hose.

In one or more embodiments of the method, the aerosol-forming substrate comprises shisha molasses.

According to an aspect of the present invention, there is provided a non-transitory computer readable medium comprising software for executing the method as above described.

According to an aspect of the present invention, there is provided a controller configured for implementing the method as above described. In some embodiments, said controller comprises software for executing the method as above described. In some embodiments, the software is provided as part of the controller in a non-transitory computer readable medium as above described.

All scientific and technical terms used herein have meanings commonly used in the art unless otherwise specified. The definitions provided herein are to facilitate understanding of certain terms used frequently herein.

Features described in relation to one aspect may equally be applied to other aspects of the invention.

The invention will be further described, by way of example only, with reference to the accompanying drawings in which.

Figure 1:
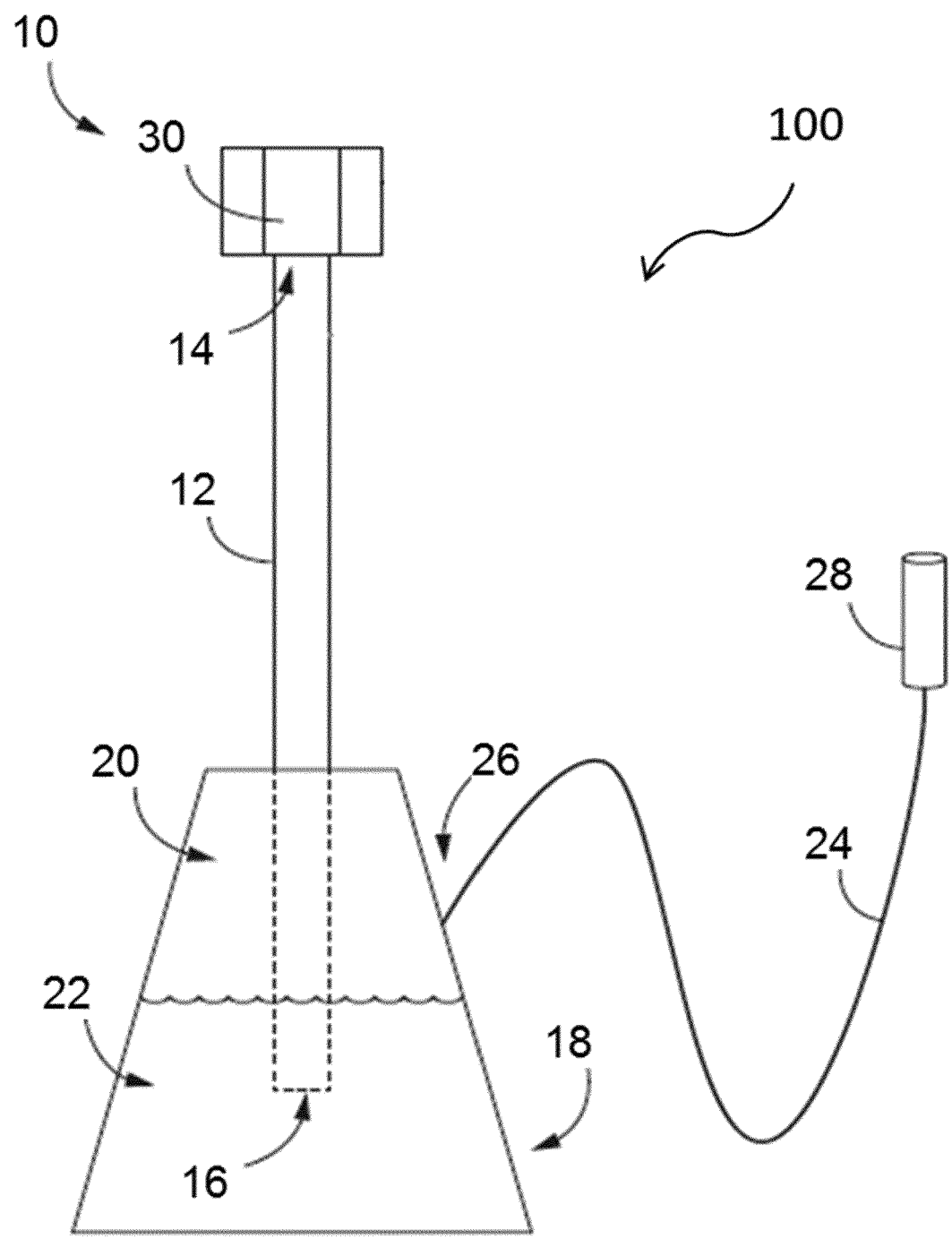
FIG. 1 shows a shisha device including an aerosol generating element of the invention.

FIG. 1 shows a shisha device 100 comprising an aerosol-generating element 10 configured to receive a cartridge 30 comprising aerosol-forming substrate 42 (not shown). The aerosol-generating element 10 may heat the aerosol-forming substrate 20 by means of electromagnetic radiation as discussed below with respect to FIG. 2, to generate an aerosol. In use, the generated aerosol flows through an airflow conduit. The airflow conduit may be provided as part of a stem pipe 12. The airflow conduit comprises a proximal end portion defining a proximal opening 14 positioned to receive airflow from the aerosol-generating element 10 and a distal end portion defining a distal opening 16 positioned in an interior of a vessel 18.

The stem pipe 12 is in fluid communication with the vessel 18. An airflow channel is defined between the aerosol-generating element 10 and the interior of the vessel 18. In particular, the aerosol-generating element 10 is in fluid communication with a vessel 18, by means of stem pipe 12 at least partially defining the airflow channel. The interior of the vessel 18 comprises an upper volume 20 for head space and a lower volume 22 for liquid. A hose 24 is in fluid communication with the upper volume 20 through a head space outlet 26 formed in a side of the vessel 18 above a liquid line. A mouthpiece 28 is coupled to hose 24 for a user of the device 100.

Generated aerosol may flow from the aerosol-generating element 10, through the air flow channel via the stem pipe 12 into the lower volume 22 of the vessel 18. The aerosol may pass through liquid in the lower volume 22 and rise into the upper volume 20. Puffing by a user on a mouthpiece 28 of the hose 24 may draw the aerosol in the upper volume 20 through the head space outlet 26, into the hose 24 for inhalation. In particular, negative pressure at the mouthpiece 28 may translate into negative pressure at head space outlet 26 causing airflow through the aerosol-generating element 10 and stem pipe 12.

Figure 2:
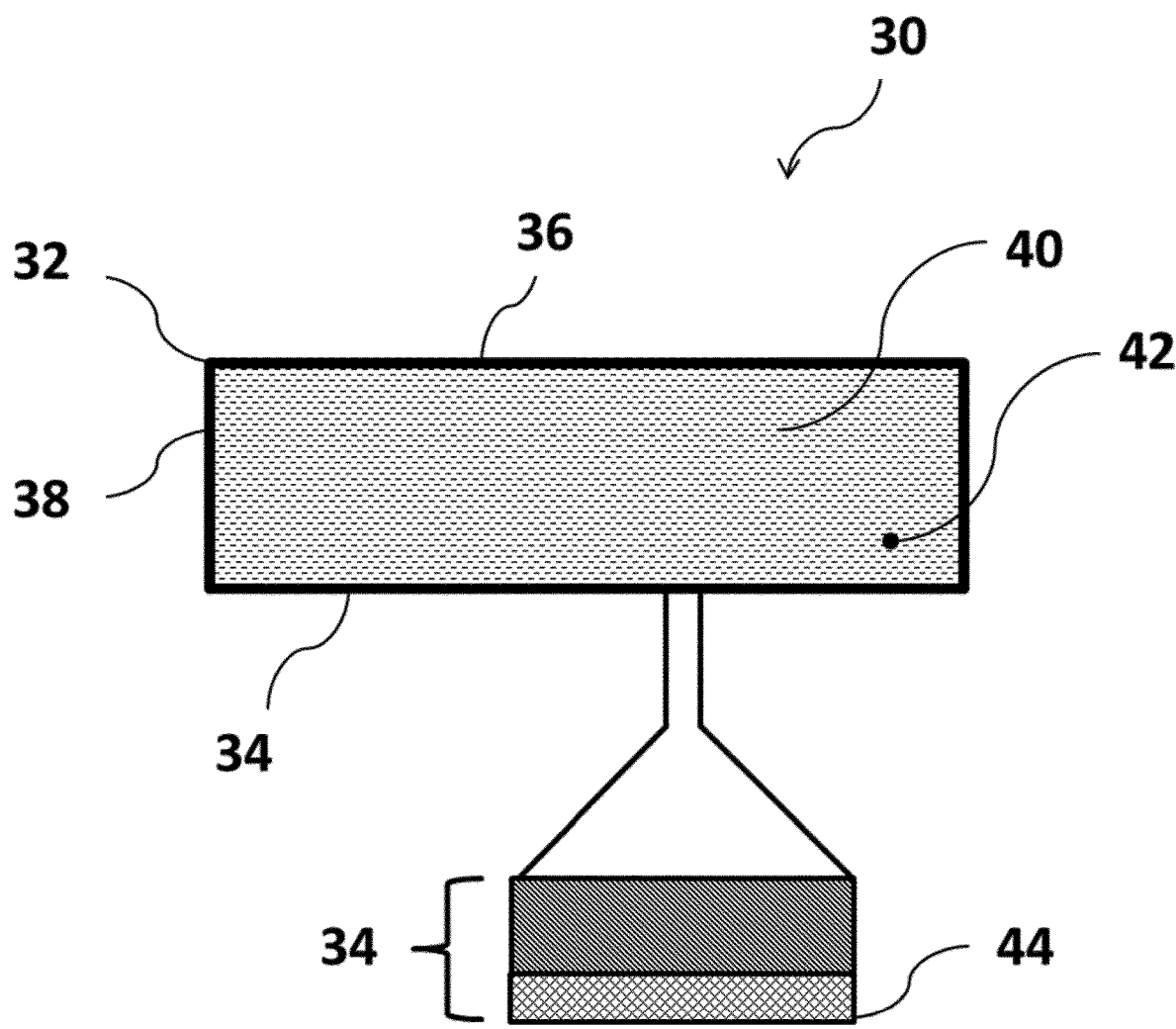
FIG. 2 shows a schematic cartridge of the invention according to an embodiment.

FIG. 2 shows a cross-section of a schematic cartridge 30 of the present invention. The cartridge 30 has a cylindrical body 32 comprising a lower wall 34, a top wall 36 and a side wall 38. The walls of the cartridge 30 define a cavity 40 which comprises aerosol-forming substrate 42.

The walls 34, 36, 38 of the cartridge are formed from aluminium which is a highly thermally conductive material. At the outer surfaces of the walls 34, 36, 38 a high emissivity material 44 is deposited. The high emissivity material 44 is a coating comprising a refractory pigment, a high emissivity additive and a binder agent. The high emissivity material may comprise of 31.2 weight percent ethyl alcohol, 7.4 weight percent acetone, 2.5 weight percent cellulosic binder, 0.8 weight percent clay binder and 58.1 weight percent cerium oxide. When the coating is dried to 500 degree Celsius, it is comprised of 98.1 weight percent cerium oxide, 0.8 weight percent carbon and 1.0 weight percent magnesium silicate. When the coating is heated above 500 degree Celsius in air, the carbon oxidizes and yields 99.0 weight percent cerium oxide and 1.0 weight percent magnesium silicate. In this case cerium oxide serves at the same time as the refractory pigment and as the high emissivity additive. The emissivity of the coating used in FIG. 2 is above 0.9.

Figure 3:
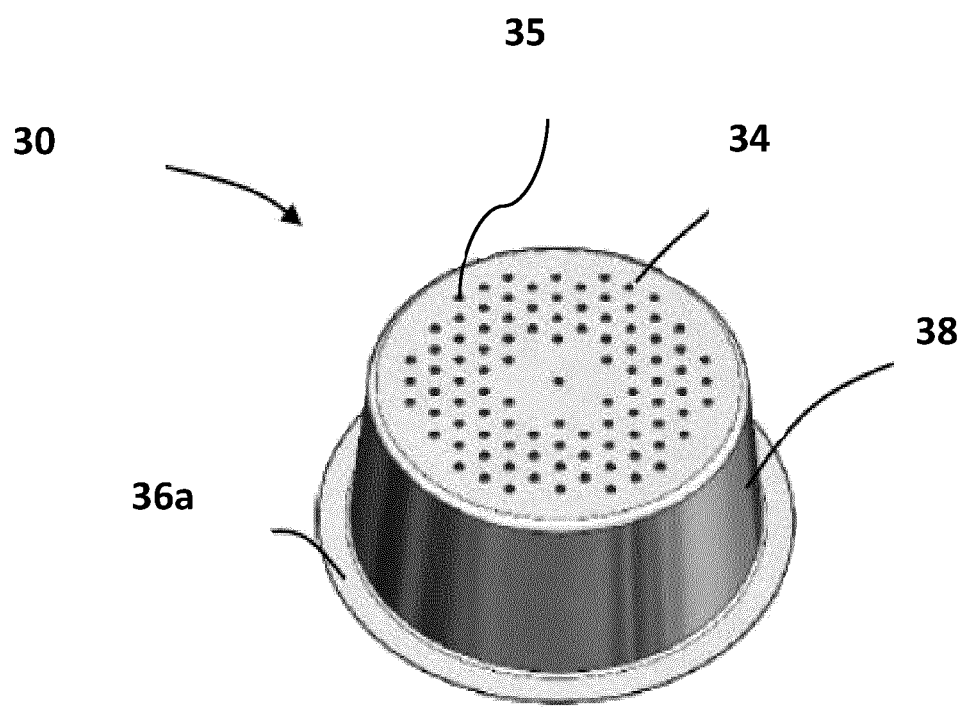
FIG. 3 shows a bottom view of an example of a frusto-conical cartridge of the invention.

FIG. 3 shows a bottom view of an embodiment of a cartridge 30 of the present invention. The cartridge 30 may have a slightly frustoconical shape which may facilitate insertion of the cartridge 30 in a receptacle of the aerosol-generating element. The bottom wall 34 of the cartridge 30 is provided with a plurality of apertures 35 for allowing the aerosol to escape from the cartridge 30. The top wall 36 of the cartridge 30 is provided with similar apertures in order to allow air to enter into the cartridge 30. The top wall 36 is additionally provided with a shoulder 36a which, in use, rests on the walls 54 of the aerosol-generating device 10 forming the receptacle 56.

Generally, air enters the cartridge 30 through apertures at the top wall 36 of the cartridge 30, passes through the cavity 40, through the aerosol-forming substrate 42, and exits the cartridge 30 through apertures 35 in the bottom wall 34 of cartridge 30.

Figure 4:
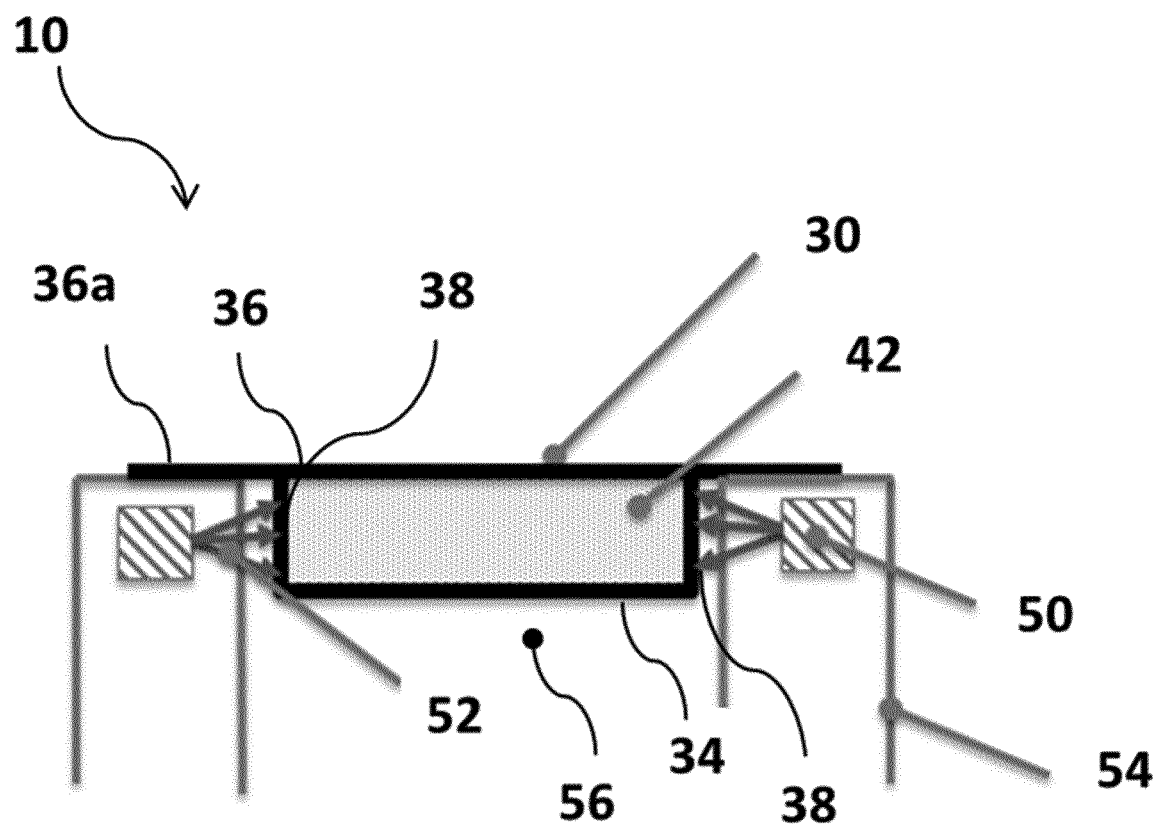
FIG. 4 shows an aerosol generating element of the invention.

FIG. 4 shows in more detail an aerosol-generating element 10 of the invention for generating an aerosol as part of a shisha device 100 of FIG. 1. Aerosol-generating element 10 comprises a photonic device 50 configured to generate and emit a beam of electromagnetic radiation 52. In the embodiment of FIG. 4, the beam of electromagnetic radiation 52 is generated by two laser diodes emitting radiation with a wavelength of between 320 nanometers and 660 nanometers at a total power of up to 30 Watts. The aerosol-generating element 10 further comprises a wall element 54 defining a receptacle 56 for receiving a cartridge 30 comprising aerosol-forming substrate 42. The aerosol-generating element 10 is arranged to heat the cartridge 30 by directing the beam of electromagnetic radiation 52 from the two laser diodes 50 onto the cartridge 30 received in the receptacle 54.

In the embodiment of FIG. 4 the top wall 36 of the cartridge 30 comprises two shoulders 36a, which, in use, are supported by wall element 54. The two laser diodes 50 are provided in wall element 54 surrounding cartridge 30. The electromagnetic radiation 52 is directed towards the side wall 38 of the cartridge 30. The high emissivity coating 44 of the cartridge 30 absorbs the electromagnetic radiation 52 emitted from the photonic devices 50, and transforms the radiation energy into thermal energy. As the cartridge 30 is formed from aluminium and as aluminium has high thermal conductivity, the heat distributes homogenously across the body 32 of the cartridge 30.

Figure 5:
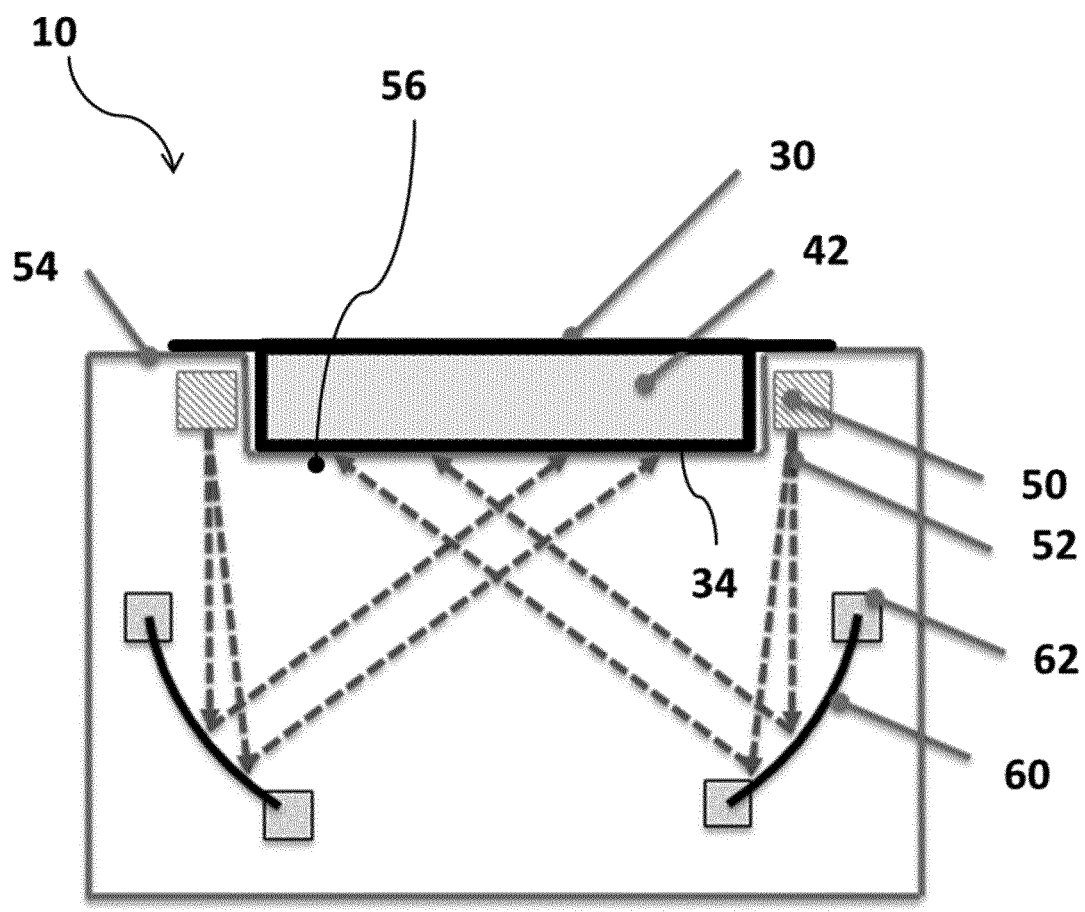
FIG. 5 shows an aerosol generating element of the invention according to another embodiment.

In FIG. 5 a modification of the aerosol-generating element 10 of FIG. 4 is depicted. The modification mainly concerns the optical path of the electromagnetic radiation 52. Instead of a direct irradiation of the side wall 38, the laser diodes are indirectly irradiating the bottom wall 34 of the cartridge 30.

To this end, the beam of electromagnetic radiation 52 generated by each laser diode 50 is directed downwards onto an optical element 60 provided at a lower part of the aerosol-generating element 10.

The optical elements 60 are configured to manipulate the beams of electromagnetic radiation 52. In the embodiment of FIG. 5 the optical elements 60 comprises curved mirrors for manipulating the beam of electromagnetic radiation 52 reflecting the beam 52 such that the beam 52 changes direction. Preferably, the radius of the curved mirror is not fixed but rather can be manipulated dynamically by means of, for example, water or air pressure.

Each optical element 60 is mounted in the aerosol-generating element 10 by means of optical mount 62. In the embodiment shown in FIG. 5, each beam of electromagnetic radiation 52 comprises an incident beam of electromagnetic radiation propagating from the laser device 50 towards the curved mirror and a reflected beam of electromagnetic radiation propagating from the curved mirror to the cartridge 30. The curved mirror reflects the beam of electromagnetic radiation 52, changing the direction of the beam 52 to a new direction, which direction is at an angle of approximately 60 degrees relative to the original direction of the beam. Thus, there is an angle of approximately 60 degrees between the incident beam of electromagnetic radiation and the reflected beam of electromagnetic radiation. However, other angles of reflection may be adjusted if desired.

The optical mount 62 may be movable in order to adjust different angles of reflection. The position on the cartridge 30 at which the beam of electromagnetic radiation 52 irradiates the bottom wall 34 of the cartridge 30 may be manipulated dynamically by movable optical mount 62. For example, the angle of rotation of the curved mirror with respect to the incident electromagnetic beam can be manipulated using the movable optical mount 62. For example, the movable optical mount 62 may comprise a microstructured assembly of stepper motors. As depicted in FIG. 5, each beam of electromagnetic radiation 52 emitted by the laser diodes 50 is re-directed to different portions of the cartridge 30. These portions may overlap such that the complete bottom wall 34 of the cartridge 30 is irradiated.

Upon absorption of the beam of electromagnetic radiation 52 by the high emissivity coating 44, and then by conduction, the temperature of the aerosol-forming substrate 42 increases until reaching a temperature where vapor is generated and an aerosol is formed. The bottom wall 34 of cartridge 30 is provided with apertures 35 for enabling airflow through the capsule 30.

Figure 6:
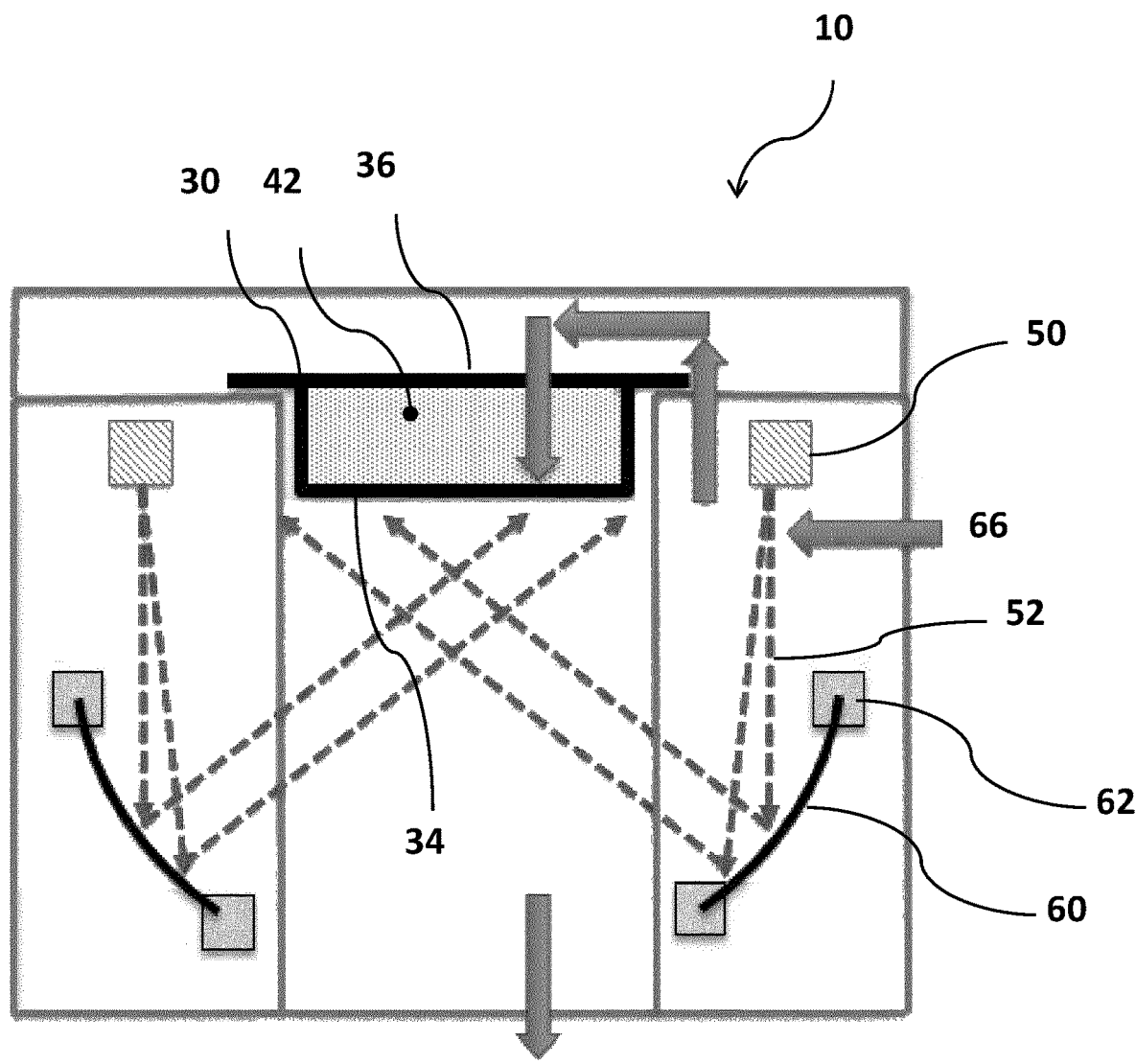
FIG. 6 shows an air flow path in the aerosol generating element of FIG. 5.

FIG. 6 schematically shows an exemplary air flow path through the aerosol-generating element 10 of FIG. 5. Fresh ambient air enters the aerosol-generating element 10 through air inlets 66 of the shisha device 100. The fresh air is guided past the photonic devices 50. The cool ambient air thereby cools the photonic devices 50 and at the same time, the fresh ambient air is pre-heated. The pre-heated ambient air is then directed from above, through the apertures in the top surface 36 of the cartridge 30 and into the cavity. Upon passing through the cartridge 30, the pre-heated ambient air mixes with the vapours generated from the heated aerosol-forming substrate 42, forming an aerosol. The aerosol leaves the cartridge 30 through the apertures in the bottom wall 34 of the cartridge 30 and is directed via the stem pipe 12 to the vessel 18 of the shisha device 100.

By directing the cool ambient air past the photonic devices 50 the photonic devices 50 are efficiently cooled, which ensures optimum performance of the photonic devices 50. At the same time the air is pre-heated before entering the cartridge 30, such that the waste heat from the photonic devices 50 can be used in aerosol generation, providing a more efficient process.

In FIGS. 4 to 6 only two photonic devices 50 are depicted at either side of the cartridge 30. Of course additional photonic devices 50 may be provided at any position along the circumference of the receptacle 56 of the aerosol-generating device 10. Preferably the photonic devices 50 are equidistantly distributed around the circumference of the receptacle 56. Similarly, FIG. 6 only shows one air inlet 66. Of course more than one air inlet may be provided. In some embodiments, corresponding air inlets 66 may be provided for each photonic device 50 of the aerosol-generating element 10.

The invention claimed is:

1. A system comprising:
   a cartridge for a radiation heated aerosol-generating device, the cartridge comprising a wall of the cartridge defining a cavity, and
an aerosol-forming substrate within the cavity,
wherein an outer surface of the wall of the cartridge comprises a high emissivity material; and
an aerosol-generating device comprising an aerosol-generating element for generating an aerosol in the aerosol-generating device, the aerosol-generating element comprising
a photonic device configured to generate electromagnetic radiation, and
a receptacle for receiving the cartridge,
wherein the aerosol-generating element is arranged to heat the aerosol-forming substrate within the cartridge by directing the electromagnetic radiation onto the cartridge.

2. The system according to claim 1, wherein the aerosol-generating device is a shisha device.

3. A cartridge for use in a system according to claim 1, the cartridge comprising
a wall of the cartridge defining a cavity; and
an aerosol-forming substrate within the cavity;
wherein an outer surface of the wall of the cartridge comprises a high emissivity material.

4. The cartridge according to claim 3, wherein the wall of the cartridge defining the cavity is made of a highly thermally conductive material.

5. The cartridge according to claim 3, wherein the high emissivity material has an emissivity of at least 0.9.

6. The cartridge according to claim 3, wherein the high emissivity material comprises one or more transition metal oxides.

7. The cartridge according to claim 6, wherein the transition metal oxide is selected from one or more of $Cr_2O_3$, $CoO_x$, $Fe_2O_3$, and $NiO$.

8. The cartridge according to claim 3, wherein the high emissivity material is provided as a coating and the coating comprises a refractory pigment and a binder agent.

9. The cartridge according to claim 8, wherein the refractory pigment, is selected from one or more of zirconia, zirconia silicate, aluminium oxide, aluminium silicate, and silicon oxide.

10. The cartridge according to claim 3, wherein the aerosol-forming substrate comprises shisha molasses.

11. An aerosol-generating element comprising:
a photonic device configured to generate electromagnetic radiation, and
a receptacle for receiving a cartridge according to claim 3,
wherein the aerosol-generating element is arranged to heat the aerosol-forming substrate within the cartridge by directing the electromagnetic radiation onto the cartridge.

12. The aerosol-generating element according to claim 11 further comprising an optical element being located between the photonic device and the receptacle and being configured to manipulate the electromagnetic radiation.

13. The aerosol-generating element according to claim 12, wherein the optical element comprises a curved mirror for reflecting the electromagnetic radiation.

14. The aerosol-generating element according to claim 11, further comprising an air inlet and an airflow pathway, wherein a first portion of the airflow-pathway extends from the air inlet to the photonic device, and a second portion of the airflow pathway extends from the photonic device to the receptacle.

15. A method for forming an aerosol with an aerosol-generating device, the method comprising:
(a) generating electromagnetic radiation by means of a photonic device;
(b) directing the electromagnetic radiation from the photonic device to a cartridge according to claim 3 along an optical path; and
(c) heating the cartridge by means of the electromagnetic radiation.

16. The method according to claim 15, wherein (b) directing the electromagnetic radiation from the photonic device to the cartridge along the optical path comprises:
(i) guiding the electromagnetic radiation from the photonic device to an optical element;
(ii) manipulating the electromagnetic radiation by means of an optical element; and
(iii) guiding the manipulated electromagnetic radiation from the optical element to the cartridge.

17. The method according to claim 15, the method further comprising:
(d) directing an ambient air along a first portion of an airflow-pathway from an air inlet to the photonic device so as to cool the photonic device by means of the ambient air and so as to pre-heat the ambient air; and
(e) directing the pre-heated ambient air from the photonic device to the cartridge.

* * * * *